May 24, 1932. A. AMBRUSO 1,859,422
AIR BALANCED AIRCRAFT
Filed Dec. 26, 1929 4 Sheets-Sheet 3
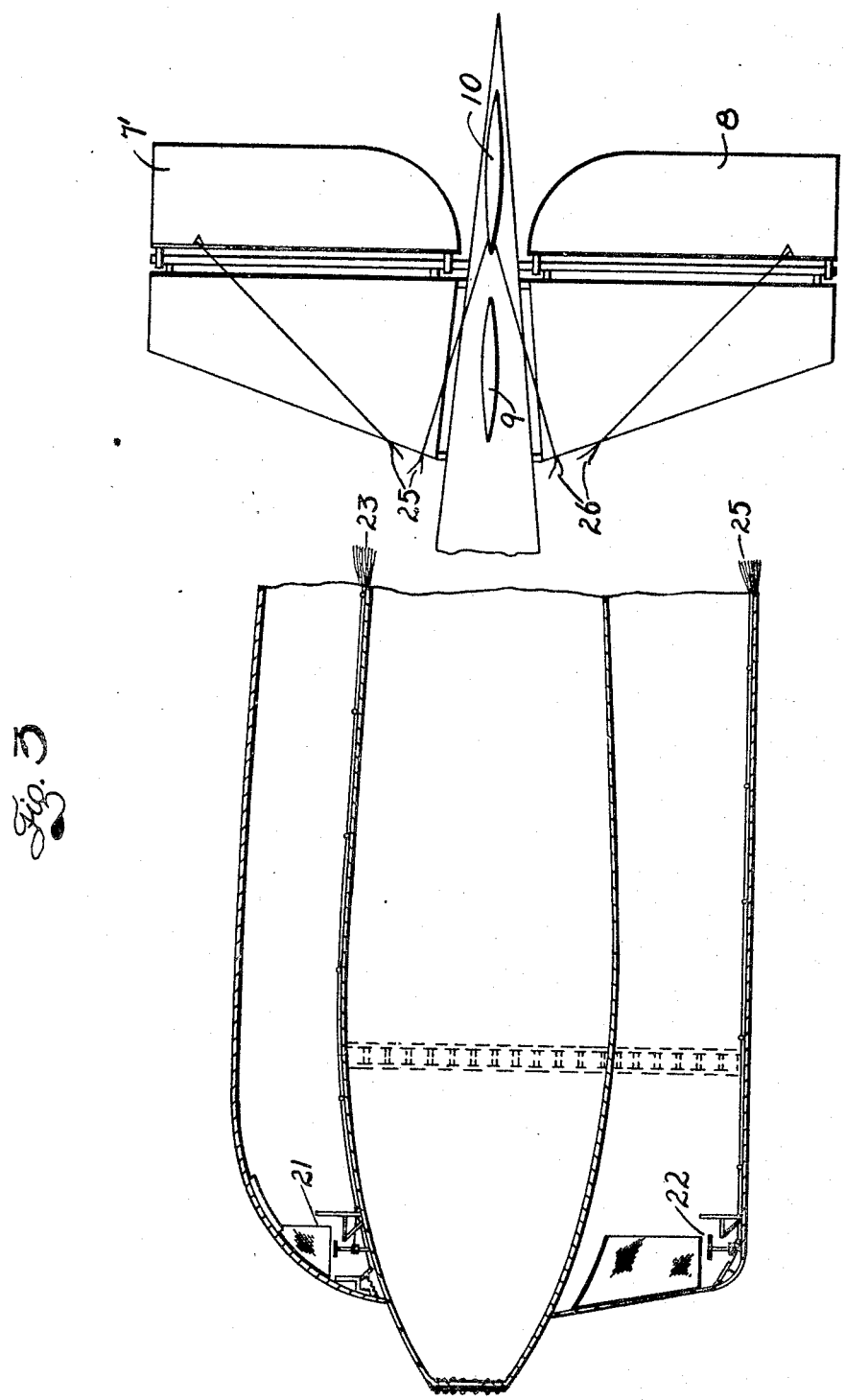
INVENTOR
Alberto Ambruso
BY
ATTORNEY

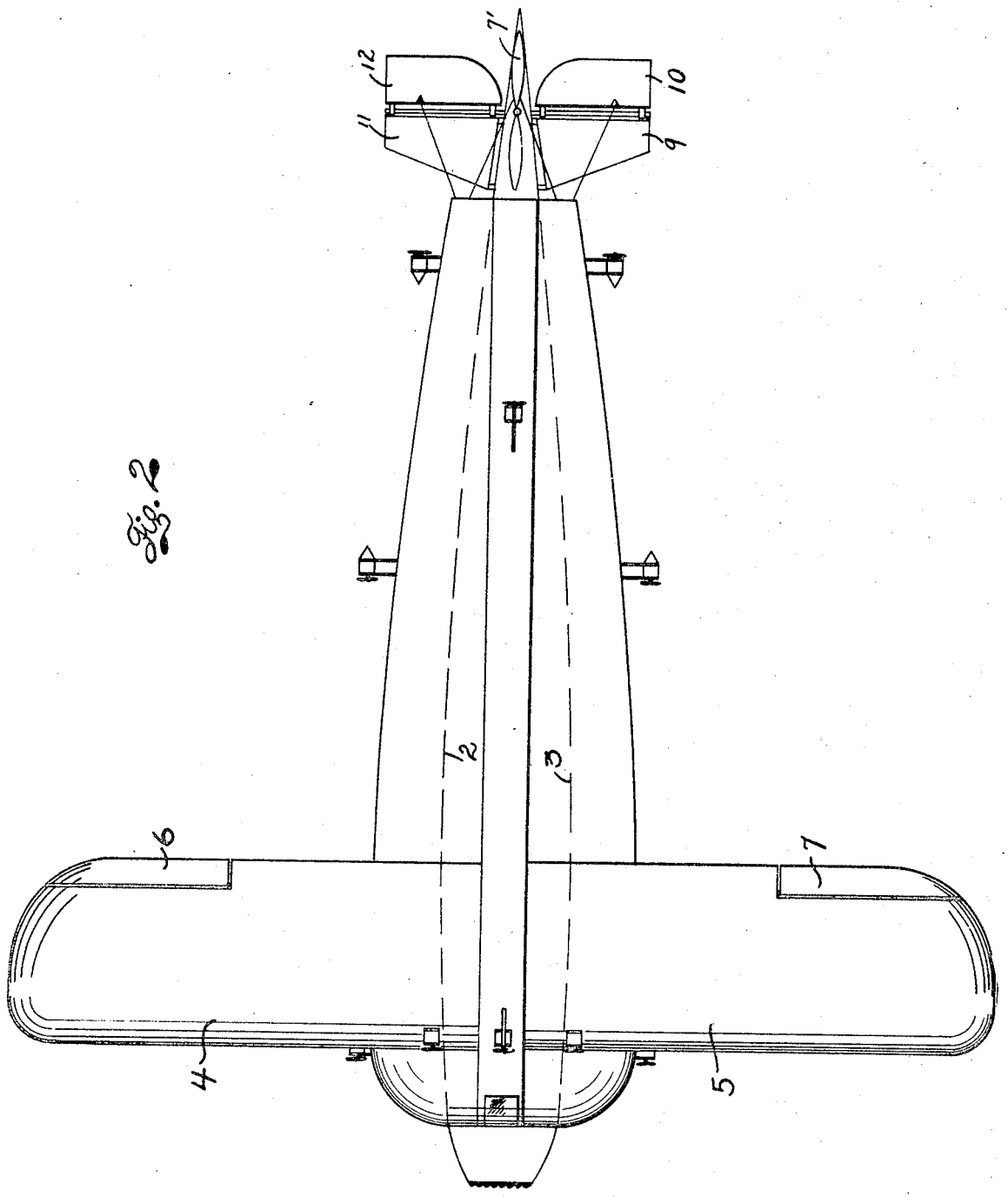

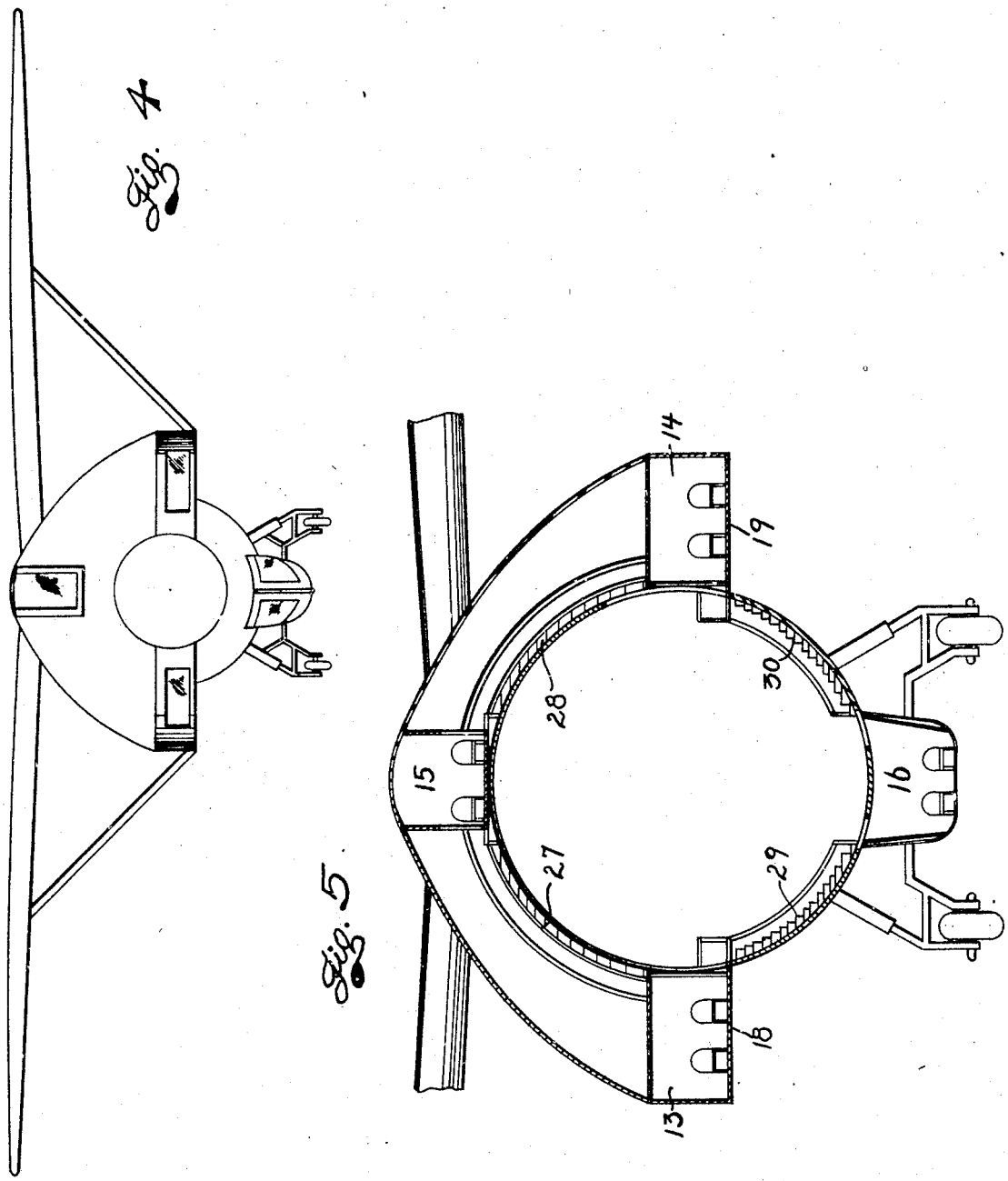

Patented May 24, 1932

1,859,422

UNITED STATES PATENT OFFICE

ALBERTO AMBRUSO, OF BROOKLYN, NEW YORK

AIR BALANCED AIRCRAFT

Application filed December 26, 1929. Serial No. 416,309.

The device, the subject of this invention, is an air balanced aircraft, and I use that term to differentiate from the two types of aircraft now in common use; that is, the lighter than air, or gas supported craft, and the heavier than air craft, commonly known as an "aeroplane".

By a balanced aircraft, I mean one wherein gas, or some other buoyant fluid is employed for supporting the machine, and its load, but wherein the quantity of gas employed, or the area known as the buoyant air, is insufficient to make it possible for the craft to leave the ground of the applied buoyancy, and wherein it is necessary to provide engines and wings or air foils and elevators, and plane-supporting surfaces to make it possible for the craft to leave the ground, or soar aloft.

The special advantages of this type of structure are many. It has the advantage of greater pay load for surface. It also has the advantage of greater speed and greater flexibility than the ordinary lighter than air machine, and while it must be admitted that it has not the extreme maneuverability or flexibility of an aeroplane, nevertheless, its failure in this flexibility or maneuverability is only due to its size.

An object of this invention is, then, to construct an air craft having wings, elevators, ailerons and rudders of an aeroplane, and in combination therewith, a part, at least, of the gas bag area and gas buoyancy of lighter than airship.

Another object is to provide greater supporting area.

Another object is to provide for the utilization of back air pressures.

Another object is to provide maximum passenger-carrying area.

Another object is to provide dual, and yet insolated control cabins, so separated from each other that the greatest possible range of vision is provided, and another object is, as previously set forth, to provide maximum maneuverability, with maximum buoyancy.

The following is what I consider the best means of carrying out my invention, and the accompanying drawings should be referred to for a complete understanding of the specification which follows.

In the drawings:—

Fig. 2, is a top plan view.

Fig. 3, is a central longitudinal, though fractured section, the fracture being necessary for the purpose of increasing the scale.

Fig. 4, is a front elevation, and

Figure 1:
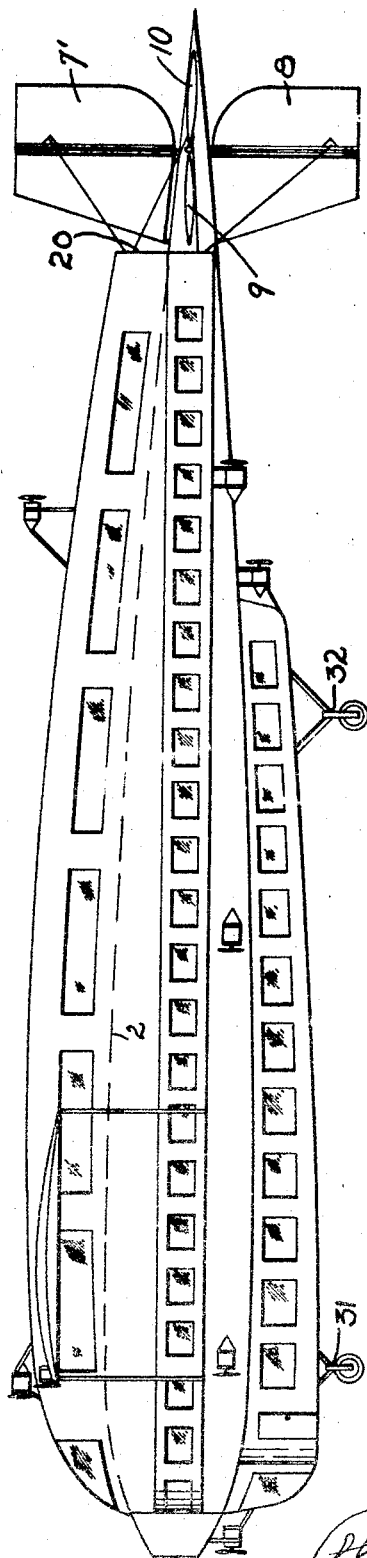
Fig. 1, shows a side elevation of my airship.

Fig. 5, a section on an enlarged scale of the body of the machine, the section being taken immediately aft of the tip of the machine.

Similar reference numerals indicate like parts in all the figures where they appear.

My device consists of a body, which I might term a "fuselage", but which is not an ordinary aeroplane fuselage in that the central portion, as indicated at 1, is hollow and is given up for the reception of one or more gas containers, not shown.

These gas containers may be of the ordinary material used for this purpose, and may be made sectional, if desired. The containers are arranged upon the longitudinal center line, the space being indicated in part in Figs. 1 and 2, by the dotted lines 2 and 3.

My device is also provided with wings or air foils, as shown at 4 and 5, and each wing is provided with ailerons 6 and 7. I prefer that the wings should be arranged high up on the side of the body of my machine. A single pair of wings is all that it is believed will be necessary.

I also provide rudders 7' and 8, and elevators, as shown at 9, 10, 11 and 12. All of these parts; that is, the wings or air foils and the elevators and rudders may be of the construction usually employed in aeroplanes, and function in the same manner as they do in aeroplanes.

It will be noted that I have provided four cabins, or passenger spaces, arranging them as best shown in Fig. 5, the cabins 13 and 14 being arranged one at each side of the ship, and the cabins 15 and 16 at the top and bottom of the ship respectively, and I call particular attention to the fact that the passenger spaces 13 and 14 project outward, and that their bottoms 18 and 19 are flat. These cabins then, are flat-bottom sponsons, arranged to add supporting surface to my device.

The aft end of all cabins terminates abruptly, as shown at 20, so as to provide a surface against which back wash or trailing air pressure may be applied to urge the ship forward, or to at least prevent a drag.

I have shown numerous motors; in the illustration, have shown twelve motors arranged at different points; the number, however, may be varied, depending entirely upon the size of the machine and the speed desired.

I have shown two control stations—one in the upper cabin, and indicated at 21, and one in the lower cabin, and indicated at 22, and at 23, 24, 25 and 26, I indicate the control cables operated from the control stations.

Communicating passages are provided between the several cabins, and such passages are provided with ladders or stairs, such stairs being shown at 27, 28, 29 and 30; ladders may, however, be substituted.

I also provide a suitable landing gear, consisting of two double-wheel carriages, the carriage 31 being arranged at, or near the forward end of the machine, and the carriage 32 being at, or near the aft end of the machine.

I will, of course, provide brakes for the wheels of the landing gear. Numerous windows are shown in Fig. 1, but as these are customarily provided, no reference will be made to them, and while I have shown only chairs in the cabins in Fig. 5, it will be understood that every convenience may be supplied, as will be warranted by the size and general construction of the ship.

I desire it understood that the dimensions of all of the parts of my device may be varied at will, and other modifications may be made within the scope of the appended claims without departing from the principle or sacrificing the advantages of this invention; it will, however, be noted that my device is made on a stream line and accepted dihedral is given the wings; that the wings are provided with a top camber, and may be provided with a bottom camber, if such is found desirable.

Having carefully and fully described my invention, what I claim and desire to secure by Letters Patent is:—

In an airship, a body member having a plurality of cabins associated therewith, the aft end of all cabins terminating at a sharp angle to receive the pressure of the back wash of air, a plurality of means for supporting said ship in the air, and a plurality of means for driving said ship through the air, and a plurality of means for controlling said ship, all combined as herein specified.

ALBERTO AMBRUSO.